(12) United States Patent
Safe et al.

(10) Patent No.: US 7,156,474 B2
(45) Date of Patent: Jan. 2, 2007

(54) TRACK AND DRIVE MECHANISM FOR A VEHICLE

(75) Inventors: Cary Safe, Grand Rapids, MN (US); Brad Lemke, Grand Rapids, MN (US)

(73) Assignee: A.S.V., Inc., Grand Rapids, MN (US)

( * ) Notice: Subject to any disclaimer, the term of this patent is extended or adjusted under 35 U.S.C. 154(b) by 0 days.

(21) Appl. No.: 10/612,835

(22) Filed: Jun. 30, 2003

(65) Prior Publication Data

US 2004/0070273 A1    Apr. 15, 2004

Related U.S. Application Data

(60) Provisional application No. 60/392,393, filed on Jun. 28, 2002.

(51) Int. Cl.
*B62D 55/12* (2006.01)
*F16H 57/00* (2006.01)

(52) U.S. Cl. ............... 305/199; 305/193; 305/115

(58) Field of Classification Search ............ 305/195, 305/199, 169, 191, 193, 115, 107, 110, 160, 305/178, 173–175
See application file for complete search history.

(56) References Cited

U.S. PATENT DOCUMENTS

| 2,476,460 | A | * | 7/1949 | Smith | 305/112 |
| 2,854,294 | A | * | 9/1958 | Bannister | 305/53 |
| 3,575,474 | A | * | 4/1971 | Russ, Sr. | 305/165 |
| 5,352,029 | A | * | 10/1994 | Nagorcka | 305/199 |
| 5,984,438 | A | * | 11/1999 | Tsunoda et al. | 305/169 |
| 6,062,662 | A | * | 5/2000 | Witt | 305/130 |
| 6,247,547 | B1 | * | 6/2001 | Lemke et al. | 180/9.5 |
| 6,497,460 | B1 | * | 12/2002 | Lemke et al. | 305/132 |
| 6,595,603 | B1 | * | 7/2003 | Rutz et al. | 305/199 |
| 6,698,850 | B1 | * | 3/2004 | Ueno | 305/115 |
| 2001/0004947 | A1 | * | 6/2001 | Lemke et al. | 180/9.5 |

FOREIGN PATENT DOCUMENTS

JP        62-122868     *  4/1987

* cited by examiner

*Primary Examiner*—Jason R. Bellinger
(74) *Attorney, Agent, or Firm*—Schwegman, Lundberg, Woessner & Kluth, P.A.

(57) ABSTRACT

A tracked vehicle capable of traversing a variety of surfaces without damaging the surface traversed includes a track having an inner surface, an outer surface, and a pitch line between the inner surface and the outer surface. Driving lugs are attached to the inner surface of the track. The vehicle also includes a driver sprocket assembly having a number of driving portions for engaging the driving lugs to drive the track. Each drive lug has at least one angled sidewall which, as the drive lug is engaged with the drive portion, presents a wall either substantially parallel to a line between the axis of rotation of the sprocket and the driving portion of the sprocket or slightly declined with respect to a line between the axis of rotation of the sprocket and the driving portion of the sprocket.

24 Claims, 11 Drawing Sheets

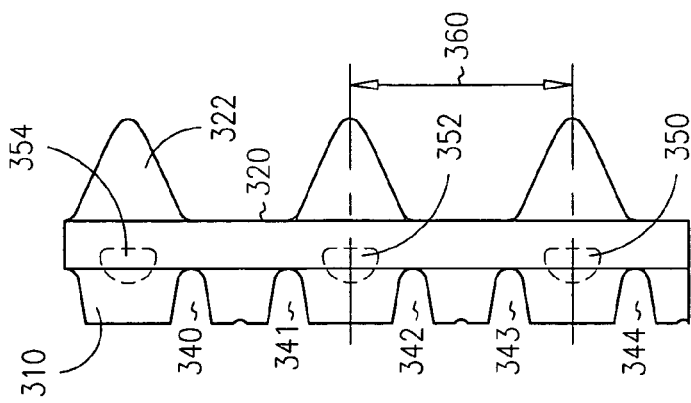
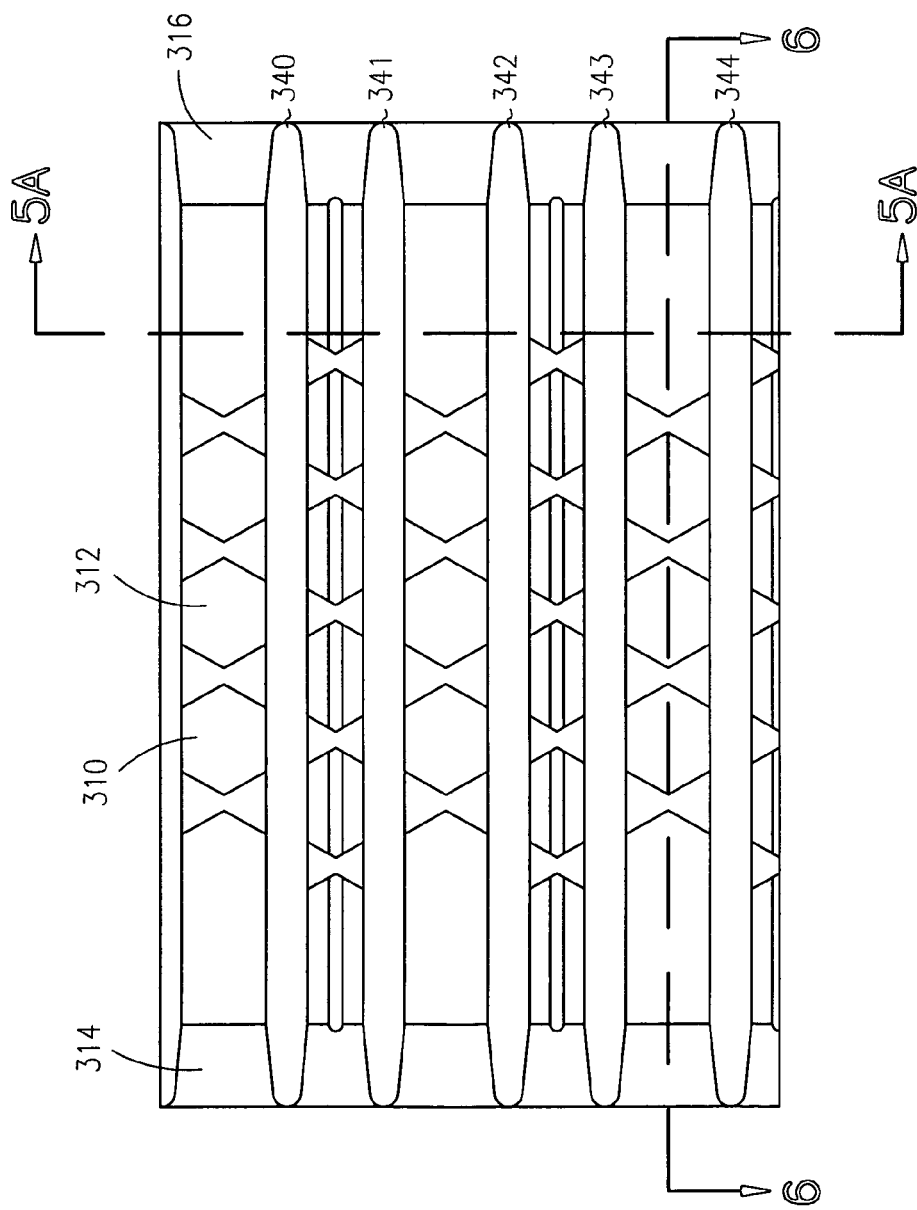

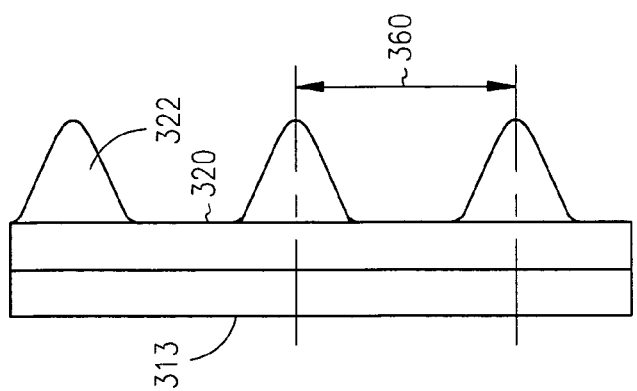
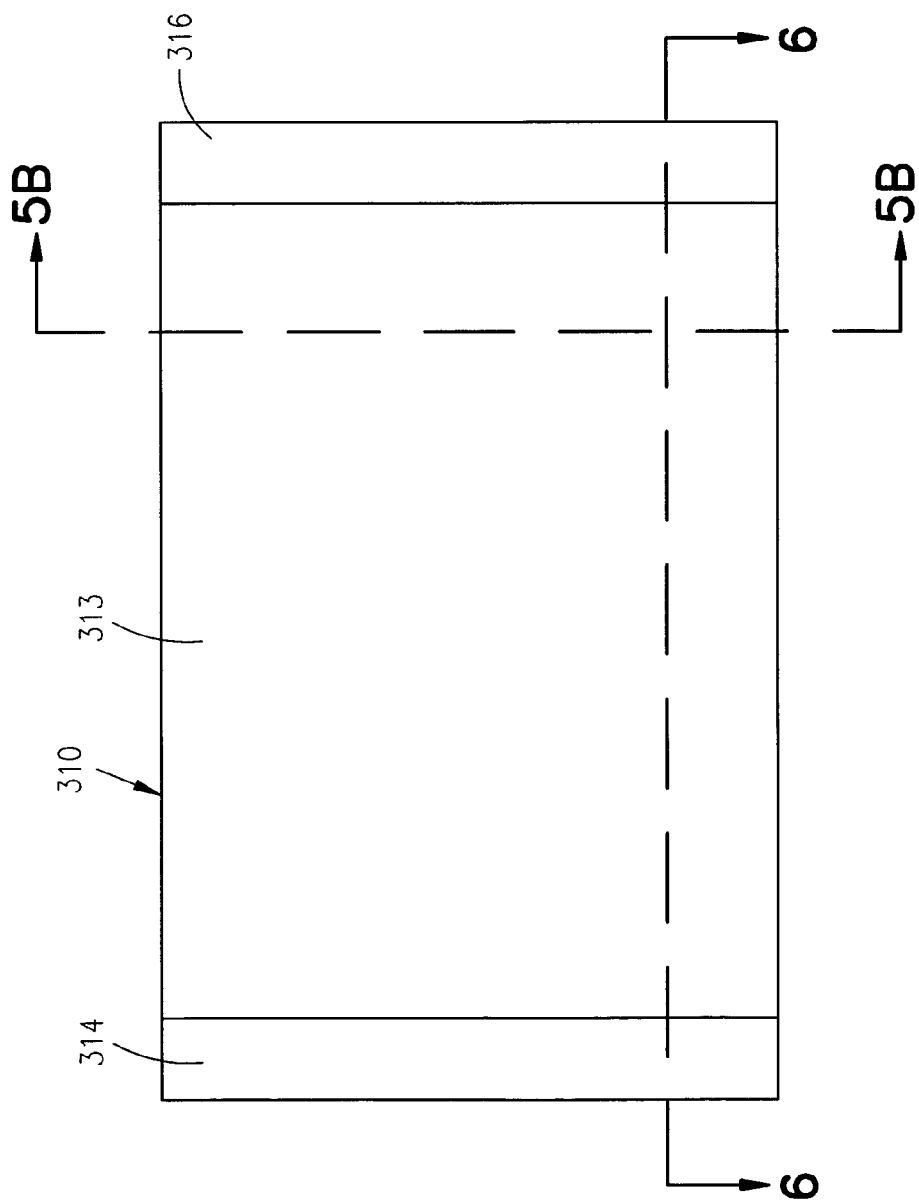

TRACK AND DRIVE MECHANISM FOR A VEHICLE

RELATED APPLICATION

This application claims priority under 35 U.S.C. 119(e) from U.S. Provisional Application Ser. No. 60/392,393 filed Jun. 28, 2002, which application is incorporated herein by reference.

FIELD OF THE INVENTION

The invention is related to a vehicle which uses a track to traverse various terrains. Specifically, the invention relates to a track and drive mechanism associated with a multi-surface vehicle with a driver and an elastomeric track having drive lugs.

BACKGROUND OF THE INVENTION

A variety of track driven vehicles have been around for many years. Tracked vehicles vary from 100 ton military tanks and bull-dozers to 300 pound snowmobiles. Track types vary from segmented steel tracks to one piece molded rubber tracks.

One of the major design challenges with all types of tracks and vehicles is to find the most efficient way to transfer the torque of the drive mechanism to the track with minimum power loss. There are many torque transmission systems. The three most common torque transmission systems are an external drive, a friction drive and an internal drive. External drives include a sprocket with a fixed number of teeth around the circumference that drives against a rigid member attached to the track. The sprocket teeth protrude through the track to a point where the rigid members can not slip back under a heavy load. Friction drives include a wheel attached to the drive axle and drive against the inside surface of a track. The outside of the wheel and the inside of the track are typically made of resilient material such as rubber or other composites. The track tension must be extremely tight to prevent slippage. The track tension also results in power loss. Internal drive systems, also known as involute drives, have a track with drive lugs attached to the inside surface of the track. The drive lugs may be molded to the inside surface of a rubber track. The drive sprocket is made by attaching rigid drive teeth to a rigid radius wheel. The sprocket teeth drive against the internal drive lugs on the track.

Internal drive systems are generally considered the most efficient drive for tracks made of elastomeric material such as rubber track with drive lugs which are properly matched to drive sprockets are properly matched. They are properly matched when the pitch diameter of the sprocket matches the pitch line of the track. Another way of determining whether they are properly matched is when the pitch diameter of the sprocket causes the drive teeth to match perfectly with the center to center distance between the track drive lugs. In practice, proper matching is difficult to achieve since an elastomeric or rubber is resilient and can stretch or compress depending on a number of factors. One of the more common factors that causes changes in the pitch length is the variation in the load applied to a track during operation of the multi-surface vehicle. The load on the track and on the internal lugs will be higher when the vehicle is pulling a load, such as a heavy log, as compared to the load on the track applied to merely move the vehicle over terrain. Another major cause of changes in pitch length occurs when a rubber tracked vehicle is turned. The tracks are loaded differently when turning. The outside track on a turn will typically be loaded to a higher degree when compared to an inside track on a turn. The pitch length of the track varies with the variations in the load applied to the track.

Variations in the pitch length of the track results in a mismatch between the pitch length of the track and the pitch diameter of the sprocket. When using a sprocket having rigid drive teeth, the change in the pitch length along the track causes the sprocket teeth to "scrub in" or "scrub out" or both. In other words, the rigid tooth is rubbing between the individual drive lugs on the internal surface of the flat belt. This causes a loss in efficiency. Scrubbing in or out can result in extreme power loss and excessive wear on the track drive lugs and sprocket teeth.

In the past, fixed sprocket teeth have been replaced with sleeve drive portions. The sleeve drive portions may be fixed sleeves with very low friction so that the power loss from "scrub in" or "scrub out" will be minimized. An alternative design is to make the drive element with rotatable sleeves which allows the drive element to roll over a portion of the drive lug so that power loss and wear is minimized.

The use of sleeves, whether fixed and made of a low friction material or whether rotatable, many times will reduce the power loss due to the "scrubbing action" but generally gives rise to another problem. This other problem is due to the fact that current drive lug designs incorporate the design starting point related to sprockets for metal tracks. In other words, the designs have their roots in sprocket designs which are thought to be related to drive lugs on an elastomeric track. The drive lugs are generally designed as though they are teeth that must engage with openings in a track. Each drive lug is a tooth with a trapezoidally shaped portion having a trapezoidal cross section. The drive lug has angled walls. The elastomeric belt can be thought of a plurality of drive lugs attached to a flat elastomeric belt. The angled walls of the drive lug form an angle with respect to the track. The angle between the walls of the drive lug and the track are set so that the drive lug will engage an opening or mating portion in the driver and will guide itself into the opening. A problem occurs, however, in designs employing a sleeve in the drive sprocket. When the drive sprocket is driving the drive lug of the belt, the angle between the sleeve and the wall of the drive lug at the time the belt is wrapped about the sprocket and in a driven position, the sleeve appears to being presented with a slight incline to "climb". A belt with such drive lugs may have a tendency to dislodge itself or jump out from the drive sprocket. Generally, the approach to fixing this problem is to wrap more of the sprocket with the drive belt. For example, if belt is covered along about 120 degrees of the circumference (this is commonly called the amount of wrap around the drive sprocket) and the belt is dislodging or jumping from the drive sprocket, one solution is to design the machine so that the amount of wrap around the drive sprocket is more than 120 degrees. For example, the amount of wrap may be increased to 150 degrees. Increasing the amount of wrap increases the amount of power needed to drive the belt. Another solution is to keep the amount of wrap the same but to increase the tension placed on the belt which tends to keep the belt from dislodging. Still another solution is to both increase the tension and increase the amount of wrap. Each of these solutions increases the amount of friction needed to drive the belt and increases the amount of power needed to drive the belt. In addition, the angle between the drive sprocket portion, such as a sleeve and the angled wall of the drive lug still presents an incline that the sleeve can "roll up" to dislodge. Thus, the belt still has the opportunity to "roll up" an incline to dislodge.

There is a need for a drive belt having lugs which are designed to resist dislodging or jumping off the track. There is also a need for a belt which uses less power when being driven and which uses a minimal amount of wrap around the circumference of the drive sprocket. If a belt required a minimal amount of wrap, the design possibilities would open up immensely. In addition, if the belt tension did not have to be tightened to make sure the belt stayed on the drive sprocket, the amount of power needed would be reduced which would provide for a much more efficient machine capable of moving loads with a reduced size powerplant. In addition, there is a need for a lower maintenance vehicle not prone to derailing the track. There is also a need for a sprocket which will accommodate the changes in the pitch line of an elastomeric flat track. In addition, there is a need for a sprocket and track with drive lugs which will either not "scrub" between the driving lugs or minimize "scrubbing" between the driving lugs. There is also a need for a sprocket which is self cleaning and which removes debris from the sprocket area to minimize problems associated with debris build up changing the pitch relationship between the sprocket and the flat track.

SUMMARY OF THE INVENTION

A tracked vehicle capable of traversing a variety of surfaces without damaging the surface traversed includes a track having an inner surface including a portion having lugs for engaging a driver sprocket. The track has an inner surface, an outer surface, and a pitch line between the inner surface and the outer surface. Driving lugs are attached to the inner surface of the track. The vehicle also includes a driver sprocket assembly having a number of driving portions for engaging the driving lugs to drive the track. Each drive lug has at least one angled sidewall which, as the drive lug is engaged with the drive portion, presents a wall either substantially parallel to a line between the axis of rotation of the sprocket and the driving portion of the sprocket or slightly declined with respect to a line between the axis of rotation of the sprocket and the driving portion of the sprocket.

A vehicle for traversing a surface includes a track. The track has an inner surface and an outer surface for gripping. The inner surface has a plurality of driving lugs attached to the inner surface. A driver sprocket drives the track. The driver sprocket has a driving portion. The driving lugs have sidewalls which make an angle with respect to the inner surface of the track such when the driving lug engages the driver sprocket, the sidewall of the driving lug presents a surface substantially parallel to a radial acting through a driving portion of the drive sprocket when engaged with the track. In one embodiment, the driver sprocket engages at least one of said plurality of driving lugs when the driving sprocket is driving the track. In another embodiment, the driver sprocket engages at least two of said plurality of driving lugs when the driving sprocket is driving the track. The driving portion of the drive sprocket may include a sleeve which, optionally, may be adapted for rotation. In one embodiment, the driving portion of the drive sprocket includes a first sleeve having a first axis and a second sleeve having a second axis. As arranged on the sprocket, the first axis and the second axis are substantially colinear and the first sleeve is separated from the second sleeve. Optionally, the first sleeve and the second sleeve may be rotatable sleeves. The driving lugs are formed into two aligned rows on the inner surface of the track, in one embodiment. The driving lugs may have walls which present a surface tangent to the driving portion defining a non parallel line to present a declined surface to the driving portion. The declined surface would tend to force the driving portion into engagement with the drive belt.

A drive belt for a vehicle is adapted to engage a drive sprocket with n number of driving portions. The drive belt includes a track portion further including an interior surface, an exterior surface, and a pitch line positioned between the interior surface and the exterior surface. Driving lugs are attached to the interior surface of the drive belt. Each of the driving lugs has at least a first sidewall making an angle with respect to the pitch line of the track. The angle of the first sidewall with respect to the pitch line of the track is in the range of $[90-(360/2n)]$ plus or minus 5 degrees, in some embodiments. The range may go down to as low as $[90-(360/2n)]$ plus or minus 1 degree, or even 0 degrees where the angle is substantially equal to $[90-(360/2n)]$.

The driving lug has a second sidewall with a second angle. In one embodiment, the second angle is substantially equal to the angle of the first side wall. The drive belt fits on a vehicle with a drive sprocket having driving portions. The first angle which the first side wall of the driving lug makes with respect to the pitch line of the track results in a line substantially parallel to a line from the axis of a drive sprocket through the driving portion of the drive sprocket while the drive lug is being driven by the driving portion of the driving sprocket. In another embodiment, the first angle which the first side wall of the driving lug makes with respect to the pitch line of the track results in a non parallel line with respect to a line from the axis of a drive sprocket through the driving portion of the drive sprocket while the drive lug is being driven by the driving portion of the driving sprocket. In some embodiments, the non parallel line intersects the line from the axis of the drive sprocket at a point below the pitch line of the track. In other embodiments, the non parallel line intersects the line from the axis of the drive sprocket at a point above the pitch line of the track. In some embodiments, the non parallel line presents a surface to the driving portion of the sprocket which declines toward the surface of the track. The driving portions of the sprocket may be sleeves which may be rotatable. In other instances, the driving portions of the sprocket are rotatable. In one embodiment, the driving portions of the sprocket are substantially equally radially spaced about the drive sprocket.

Advantageously, the vehicle will travel over soft surfaces without causing damage to the surface. The drive belt having lugs which are designed to resist dislodging or jumping off the track so that less power is needed to drive the track for given loads. In addition, the track with the drive lugs needs a minimal amount of wrap around the circumference of the drive sprocket to stay engaged with the sprocket. The track requirement of a minimal amount of wrap, opens up the design possibilities. In addition, belt tension does not have to be tighten and maintained to make sure the belt stayed on the drive sprocket. The lesser belt tension lessens the amount of power needed. The lesser belt tension also lengthens the life of the belt. The sprocket and track with these drive lugs minimize "scrubbing" between the driving lugs and the sprocket driver. The sprocket is self cleaning and removes debris from the sprocket area to minimize problems associated with debris build up changing the pitch relationship between the sprocket and the flat track. The resulting vehicle is very effective in transmitting power to the surface over which it passes. The vehicle requires very low maintenance since is less prone to track derailment.

BRIEF DESCRIPTION OF THE DRAWINGS

The following detailed description of the preferred embodiments can best be understood when read in conjunction with the following drawings, in which:

FIGS. 4a and 4b are top views of an embodiment of the track showing the tread pattern.

FIG. 5a is a cross-sectional view along line 5a—5a in FIG. 4a.

FIG. 5b is a cross-sectional view along line 5b—5b in FIG. 4b.

DETAILED DESCRIPTION

In the following detailed description, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
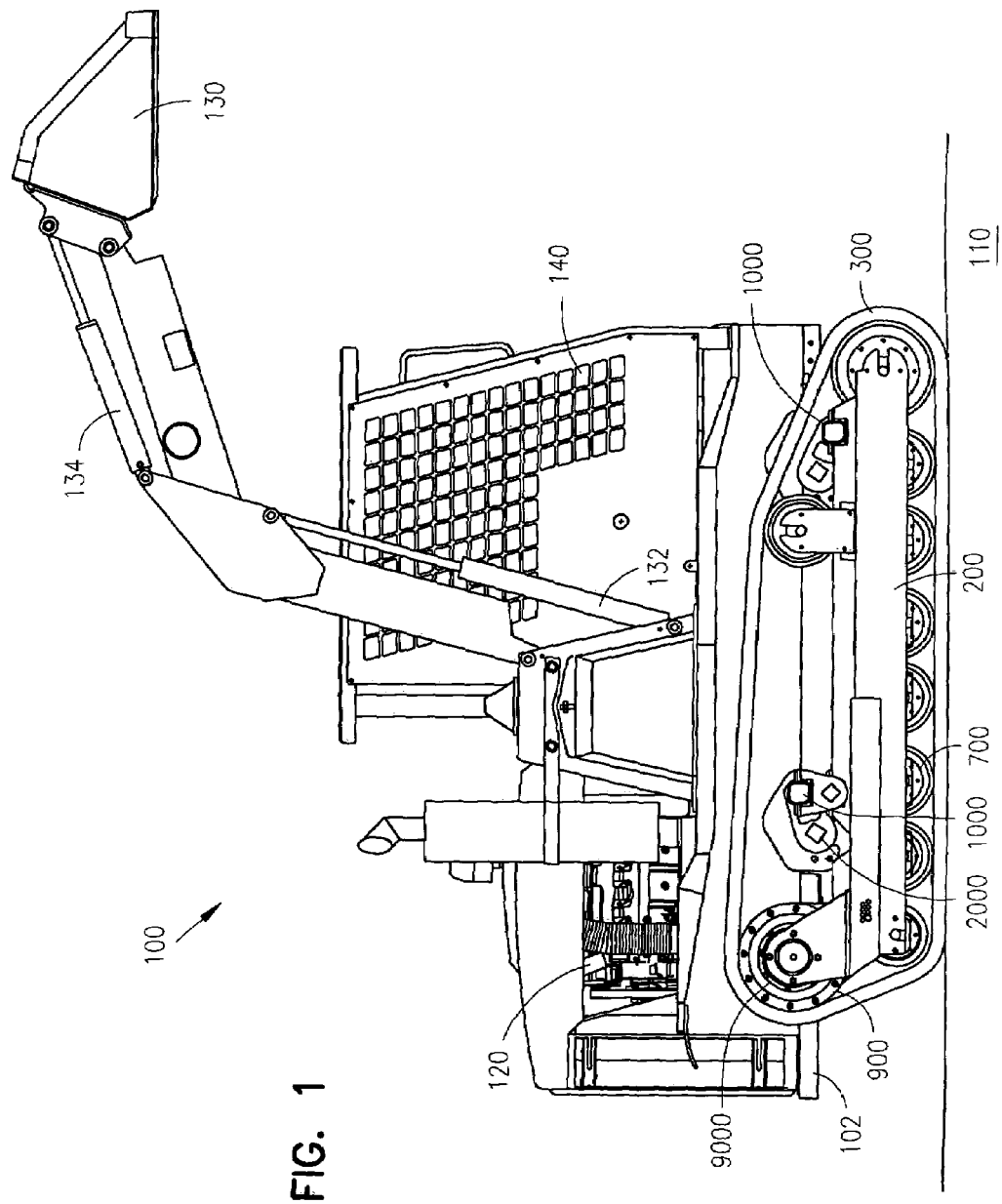
FIG. 1 is a side view of an embodiment of the multi-surface vehicle.

FIG. 1 shows a perspective view of an embodiment of the multi-surface vehicle 100 on a surface 110. The multi-surface vehicle 100 includes a body frame 102 which carries an engine 120 such as an eighty horsepower, 4.5 liter John Deere PowerTech Diesel or a one hundred fifteen horsepower, 4.5 liter John Deere PowerTech Turbo Diesel. Both of these engines are available from John Deere and Company of Moline, Illinois. The engine 120 powers a hydrostatic transmission which powers hydraulic drive motors with planetary gear boxes which eliminates additional chains and sprockets, thereby lessening the complexity and increasing the efficiency of the drive system. Two auxiliary pumps are used to power different accessories. As shown, the multi-surface vehicle 100 includes a loader/bucket accessory 130. The engine 120 powers hydraulic pumps used to drive the hydraulic cylinders 132 and 134 for operation of the loader 130. Other accessories, such as a blade or logging device may be substituted for the loader 130. The vehicle 100 also includes an operator cab 140. The operator cab 140 is equipped with controls for controlling the loader 130 and for operating the multi-surface vehicle 100. Attached to the body frame 102 of the multi-surface vehicle 100 is an undercarriage 200. A duplicate undercarriage 200 is attached to the other side of the body frame 102. The undercarriage 200 is attached to the body frame 102 via body mount systems 2000 utilizing torsion mounts 1000. The undercarriage 200 includes a drive system 9000 including a drive sprocket assembly 900 for driving an elastomeric or rubber track 300. It should be noted that the drive sprocket assembly 900 is positioned off the surface 110 so that it will stay clean for a longer life. The undercarriage 200 features multiple wheels 700 on axle assemblies (shown in FIG. 2) which engage the inner portion of the track 300 as the track engages the surface 110. The wheels 700 are of a selected diameter and spaced so that the track 300 will not bow between the contact points as the track 300 travels over the surface 110. The properties of the elastomeric track 300 also are selected so that the track 300 has a sufficient stiffness so that the track 300 stays substantially straight between the contact points of the various wheels 700. As shown in FIG. 1, eight different axle assemblies carrying wheels 700 are shown in contact with the track 300. The wheels 700 provide multiple contact points which more evenly distribute the weight of the vehicle 100 and its load over the two tracks 300. By keeping the individual tracks 300 substantially straight between the various contact points, the track 300 is also better able to grip the surface 110.

Figure 2:
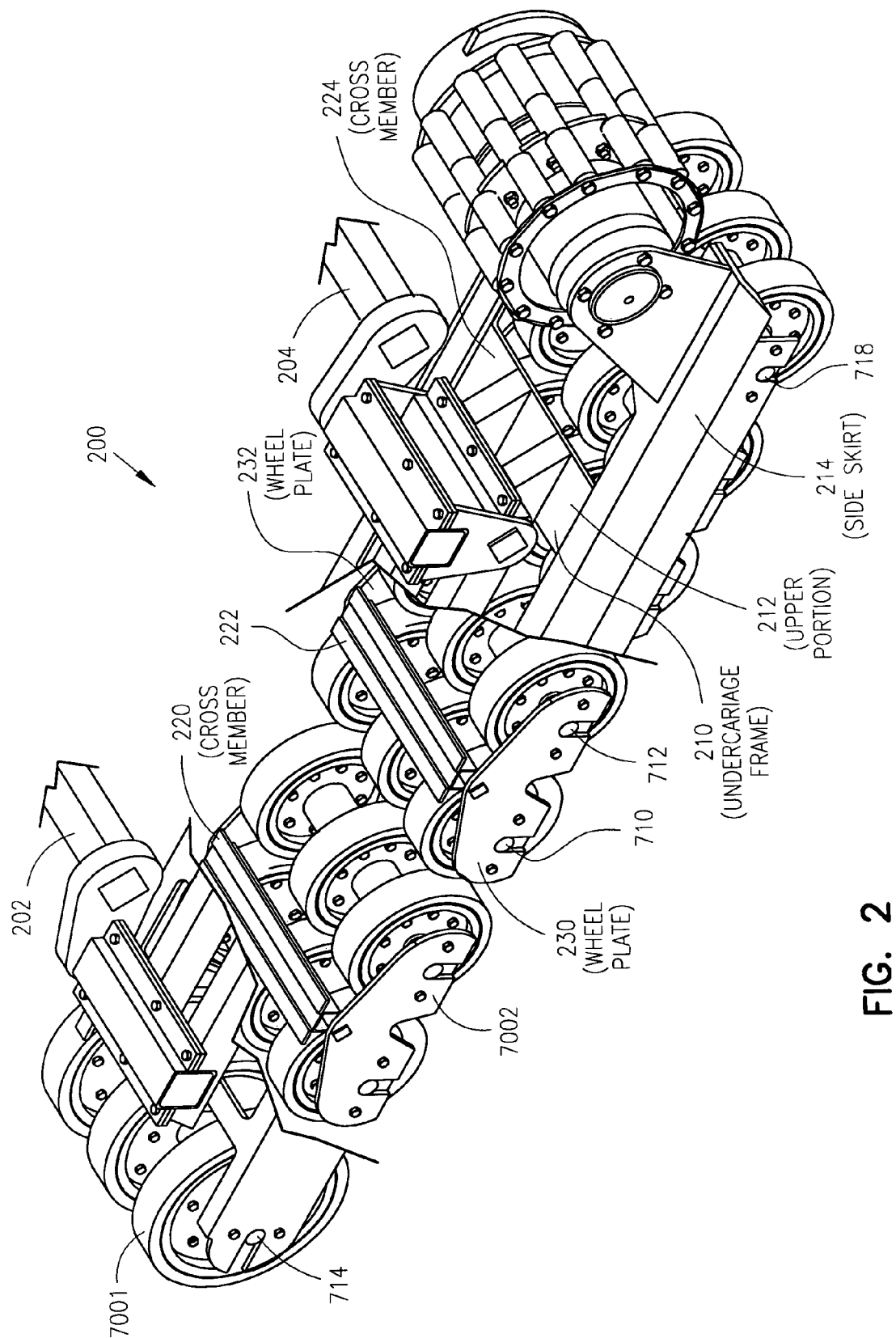
FIG. 2 is perspective view of an embodiment of the undercarriage of the multi-surface vehicle.
Figure 9:
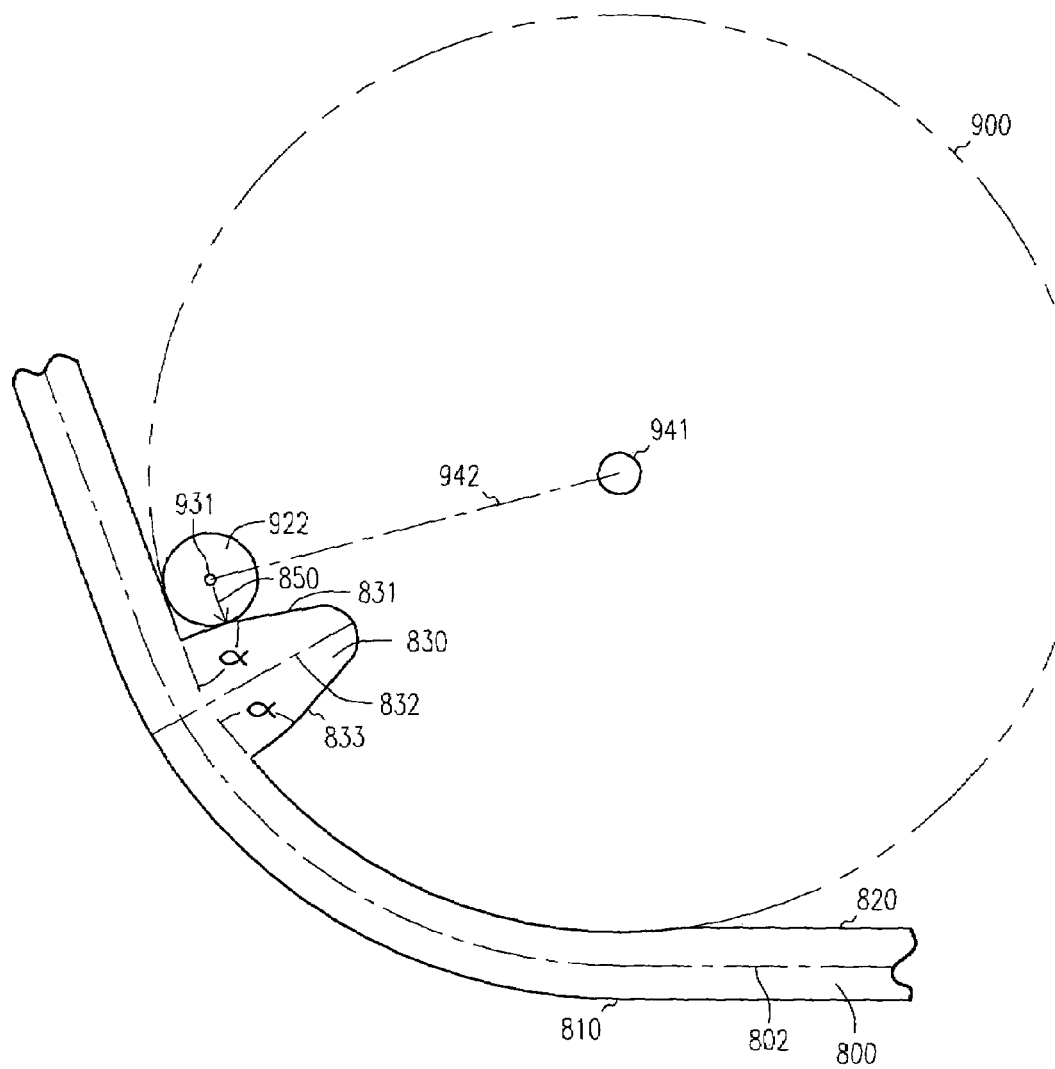
FIG. 9 is a schematic cross-sectional view of a track and driving portion of a prior art belt wrapped over the drive sprocket.

FIG. 2 is an embodiment of one side of the undercarriage 200 of the dual undercarriage 200 multi-surface vehicle 100. As can be seen from this view, there are two frame members 202 and 204 which are part of the body frame 102 of the vehicle 100. The undercarriage 200 includes an undercarriage frame 210 which includes an upper portion 212 and a side skirt 214. Attached to the undercarriage frame 210 are cross members 220, 222, and 224. The cross members support a multi-axle system 7002. The multi-axle system of this embodiment includes a laterally positioned torsion mount 1000. The torsion mount 1000, which will be described in more detail in FIG. 9, provides an essentially maintenance free component which does not require greasing or regular cleaning. Attached to each end of a torsion mount 1000 supported by cross member 222 is wheel plate 230 and wheel plate 232. The wheel plates 230 and 232 are described here. For the sake of clarity, the other wheel plates are not numbered. The other wheel plates attached to torsion mounts 1000 supported by cross members 220 and 224 are substantially identical to the wheel plates 230 and 232 attached to the torsion mount 1000 supported by cross member 222. Each wheel plate 230 and 232 carries two axle assemblies 710 and 712. Each axle assembly 710 and 712 carries three wheels 700. The wheels 700 are described later in reference to FIG. 7. FIG. 2 also shows end axle system 7001. The wheels 700 of the first end axle assembly 714 and second end axle assembly 718 are fixed with respect to the undercarriage frame 210. The end axle assemblies 714 and 718 are actually in a fixed position in a notch in the side skirt 214 of the undercarriage frame 210.

Also attached to the undercarriage frame 210 at a position above the end axle assembly 718 is a drive sprocket assembly 900. The drive sprocket assembly 900 is in a fixed position with respect to the undercarriage frame 210. It should be noted that the wheels 700 on the first end axle assembly 714, the wheels on the second end axle assembly 718, and the drive sprocket 900 are all in fixed position with respect to the undercarriage frame 210. These particular wheels 700 of end axle system 7001 and the drive sprocket assembly 900 define the outer limits of the track 300. It is important to have a substantially fixed position for these wheels 700 and the drive sprocket assembly 900 so that the track 300 is held in a substantially constant state of tension. The pitch length of an elastomeric track 300, such as those made of rubber, will vary slightly. The pitch length will stretch slightly as variable loads are applied to the track 300.

As can be seen, the plurality of wheels 700 provide for a plurality of contact points onto the internal surface of the track 320. In fact in this embodiment, the eight axle assemblies 710, 712, 714, 718 within the end axle system 7001 and multiaxle system 7002 each having 3 wheels provide for a total of 24 contact points to the internal surface of each flat track 300. The multi-surface vehicle 100 has a duplicate undercarriage 200 on the other side of the vehicle 100. Forty eight wheels 700 distribute the weight evenly over the two tracks 300 so that superior traction and flotation are achieved. There is also a minimal amount of force at each contact point. The ground pressure associated with the vehicle 100 is minimized improving the capability of the vehicle 100 to work on soft ground or lawns without forming ruts or compacting soil.

Of course to keep the soil from compacting or forming ruts, the track 300 is formed of a material which is stiff enough such that it will not bow between the contact points of the wheels 700 and the track 300 remains substantially in contact with the surface 110 being traversed.

Figure 3A:
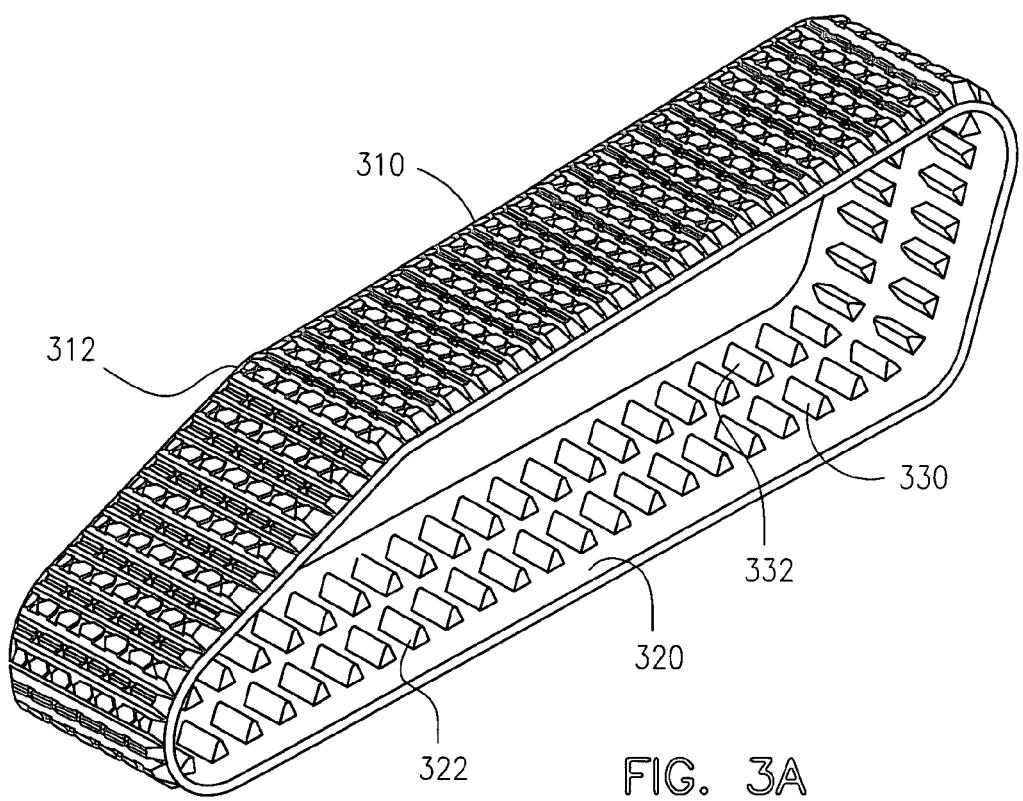
FIGS. 3a and 3b are perspective views of an embodiment of the track used with the multi-surface vehicle.
Figure 3B:
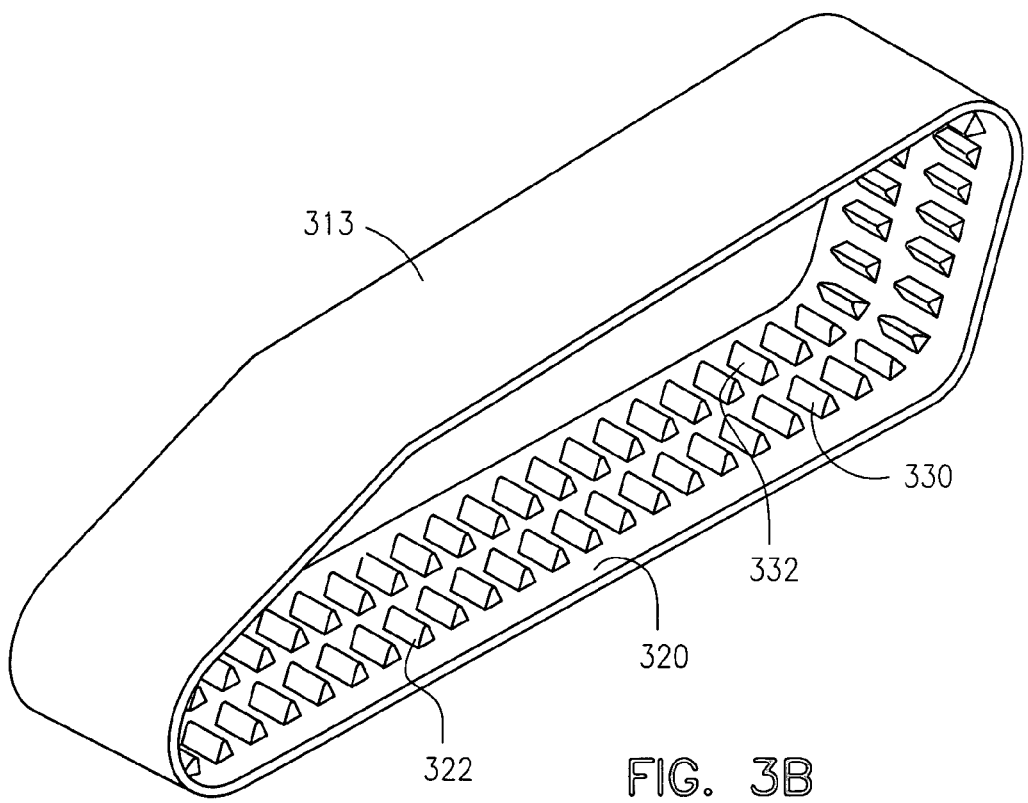

FIGS. 3a and 3b are perspective views of embodiments of the track 300 used with the multi-surface vehicle 100. The track 300 has an inner surface 320. Attached or molded to the inner surface 320 of the track 300 are a plurality of drive lugs 322. The drive lugs 322 are arranged in two rows 330 and 332. The spacing between the rows 330 and 332 is selected so that the width of the middle wheels 700 on a three wheel axle assembly 710, 712, 714, 718 fits between the first row 330 of drive lugs 322 and the second row 332 of drive lugs 322. Typically approximately one-half inch of clearance is provided so that the track 300 can shift an appropriate amount during a turn or other operation. The outer wheels 700 fit between one row of lugs 322 and the outer edge of the track 300. The spacing from one lug 322 to another within a row is selected so that the lugs 322 will properly engage the drive sprocket assembly 900. Proper engagement would match the pitch diameter of the drive sprocket assembly 900 to the pitch line of the track 300. Of course, this is difficult to achieve since there are different forces on the track 300 at various times. FIG. 3a is an embodiment of the track 300 having an outer surface 310 which has a tread pattern 312. FIG. 3b is an embodiment of the track having an outer surface 310 which is a substantially smooth outer surface 313.

FIGS. 4a and 4b are top views of embodiments of the outer surface 310 of a section of the track 300. The outer surface 310 includes a first beveled edge 314 and a second beveled edge 316. The beveled edges 314 and 316 allow some side-to-side movement which accommodates turns made with the elastomeric track 300. The allowance of the side-to-side motion from turning makes for a very environmentally friendly track 300. Unlike square edged tracks that typically dig into the ground and produce track damage, the beveled edges 314 and 316 on the track 300 can traverse the ground during a turn to leave the terrain substantially undamaged. FIG. 4a shows an outer surface 310 having a tread pattern 312 including a series of transverse grooves 340, 341, 342, 343, and 344. The transverse grooves 340, 341, 342, 343, and 344 are at a selected spacing and at a selected depth so as to leave ribs between the grooves. The ribs formed between the grooves 340, 341, 342, 343, and 344 are dimensioned so that after the track passes over the wheels 700 associated with the end axle assembly 714 or 718 of end axle system 7001 and come into contact with the ground, the ribs close and grip the vegetation or the ground surface 110 for added traction. FIG. 4b shows an outer surface 310 which is a substantially smooth outer surface 313.

FIG. 5a is a cross-sectional view along line 5—5 in FIG. 4a. Both the inner surface 320 and the outer surface 310 of the track 300 are shown in this view. The track may includes stiffeners 350, 352, and 354. The stiffeners 350, 352 and 354 increase the stiffness of the track 300 across the width of the track 300. The stiffeners 350, 352 and 354 are typically fiberglass rods which are molded into the track. The stiffeners 350, 352 and 354 are placed in the wider ribs such as those formed between grooves 341 and 342, and formed between grooves 343 and 344.

FIG. 5b is a cross-sectional view along line 5—5 in FIG. 4b. Both the inner surface 320 and the outer surface 310 of the track 300 are shown in this view. In this embodiment the track is devoid of stiffeners 350, 352, and 354.

In the embodiments shown in FIGS. 5a and 5b, the driving lugs 322 are shown molded or attached to the inner surface 320 of the track 300. The distance between the lugs 322, depicted by the reference number 360 is selected so that the engaging portions of the drive sprocket assembly 900 engages the portion of the inner surface 320 between adjacent lugs 322 in a row. Ideally, the engaging portion of the drive sprocket assembly 900 would engage the lugs 322 with little or no backlash or extra spacing located between the lugs 322. This is difficult to achieve given that the pitch of the elastomeric track 300 will stretch slightly as a function of the load placed on the track 300.

Figure 6:
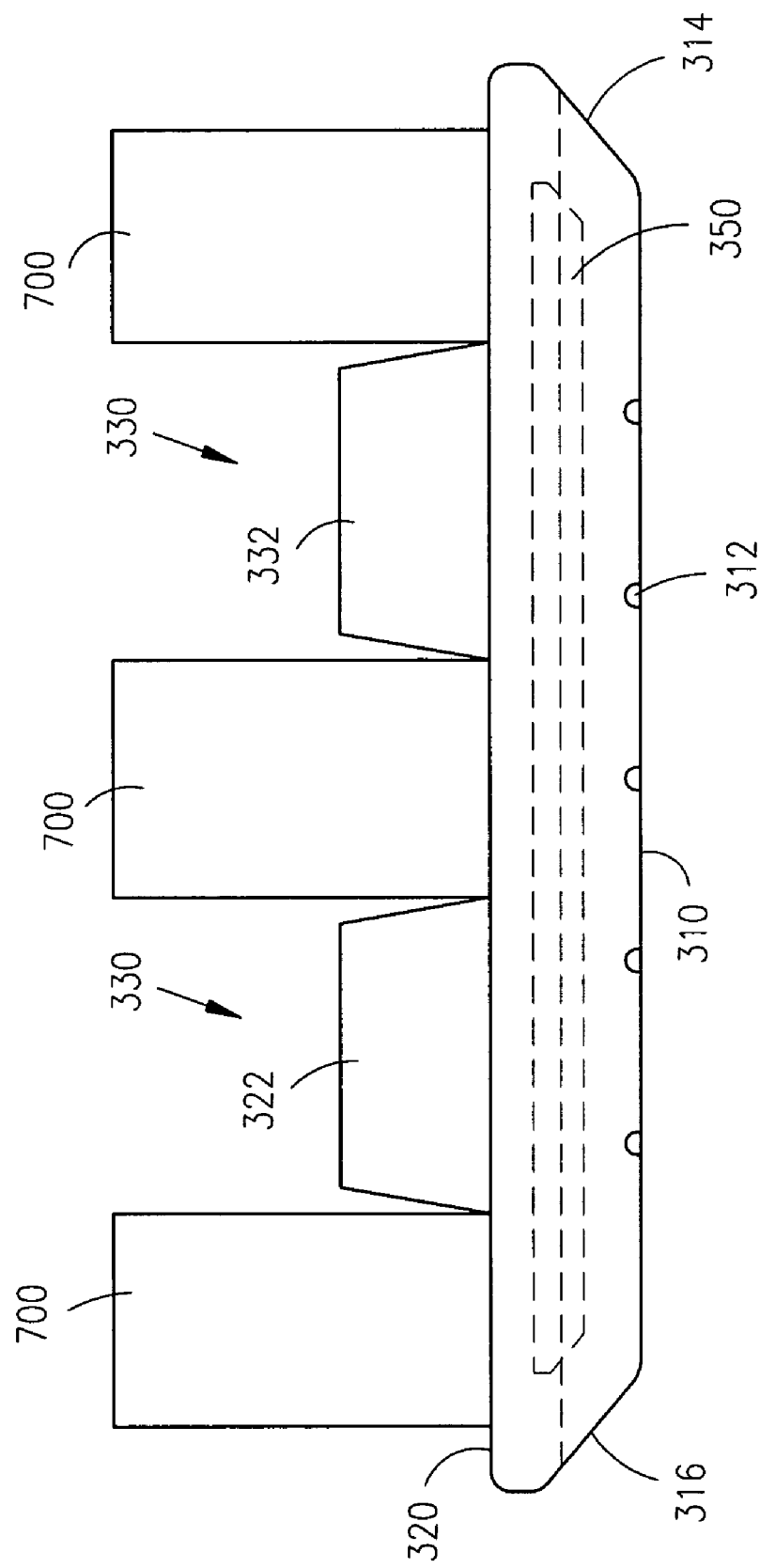
FIG. 6 is a cross-sectional view along line 6—6 in FIG. 4a showing the idler wheels in phantom engaging the lugs of the track.

FIG. 6 is a cross-sectional view along line 6—6 in FIG. 4a. The wheels 700 contacting the inner surface 320 of the track 300 have been added in phantom to FIG. 6. The rows 330 and 332 of lugs 322 are spaced such that the wheels 700 of the undercarriage 200 fit between the rows 330 and 332 and between the rows 330 and 332 and the outer edges of the track 300 such that the lugs 322 limit the side-to-side motion of the track 300 and prevent the track from dislodging or jumping off. The wheels 700 do not fit tightly with respect to the rows 330 and 332 of lugs 322. This allows for slight movement of the track 300 with respect to the wheels 700 attached to a single axle assembly, such as axle assembly 710 (shown in FIGS. 2 and 7). Another aspect of these driving lugs 322 is that the spacing on them allows the track 300 some lateral movement. The lateral movement enhances the turnability of the vehicle 100.

One stiffener 350 is shown in FIG. 6. The stiffener 350 is molded into the track 300 and is a fiberglass rod 350 positioned transverse to the path of travel. The transverse fiberglass rods 350 strengthen the track 300. The fiberglass rod 350 terminates well short of the beveled edges 314 and 316 so as to prevent the stiffener 350 from releasing from the flat track 300. On other tracks, the release of a fiberglass rod from the track was a precursor to track failure. As a result, the fiberglass rod 351 is stopped well short of the end of track 300 and then enveloped in five to seven layers of Kevlar or another tire cording material. This prevents the stiffener 350 from leaving the track 300 thereby forming a weak spot in the track.

Figure 7:
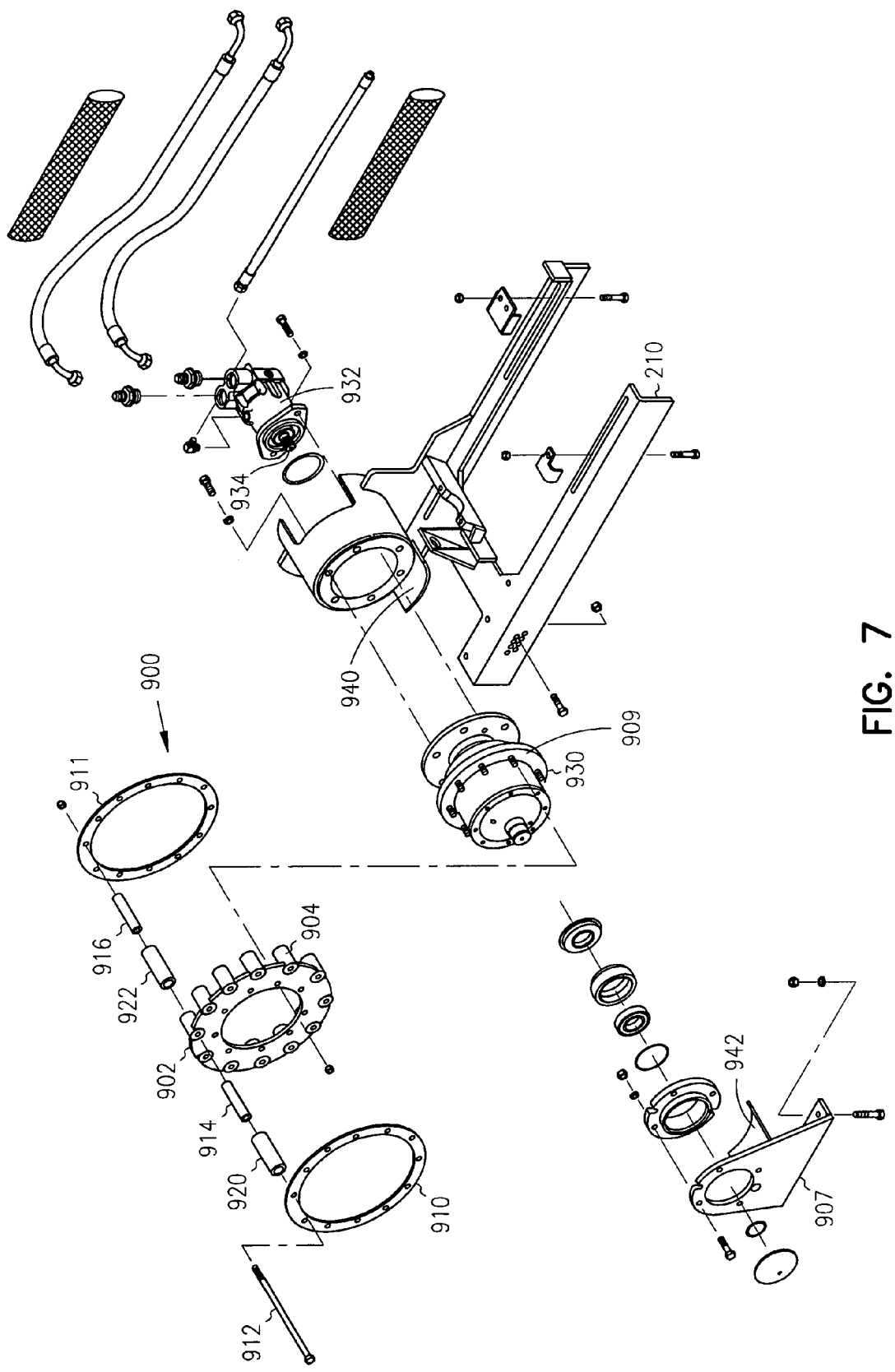
FIG. 7 is a perspective view of an embodiment of the drive sprocket assembly including scrapers.

FIG. 7 is a perspective view of an embodiment of the drive system 9000 including the drive sprocket assembly 900 which engages the drive lugs 322 on the track 300. A first scraper 940 and a second scraper 942 clear the drive sprocket assembly 900 of debris that may otherwise accumulate. The drive sprocket assembly 900 includes a central drive plate 902. A number of tubular elements 904 are welded or otherwise attached to the central drive plate 902. Attached to the central drive plate 902 is a first annular ring 910 and a second annular ring 911. As shown, the first annular ring 910 and a second annular ring 911 are attached to the central drive plate 902 using a long bolt or pin 912. A set of spacers 914 and 916 are assembled over the pin 912 and are used to define the spatial relationships between the central drive plate 902 and the first annular ring 910 and the second annular ring 911. Spacers 914 and 916 also carry roller sleeves 920 and 922. The roller sleeves 920 and 922 roll with respect to the spacers 914 and 916 and with respect to the central drive plate 902. The roller sleeves 920 and 922 fit between the central drive plate 902 and the first annular ring 910, and between the central drive plate 902 and the second annular ring 911. The roller sleeves 920 and 922 are dimensioned and radially spaced so that they can engage the spaces between the drive lugs 322 on the inside portion 320 of the elastomeric track 300. As shown in FIG. 7, there are twelve roller sleeves substantially equally spaced around the annular rings 910, 911 and the central drive plate 902. It should be noted that the number, N, of sleeves 920, 922 or driving portions substantially equally spaced about the first annular ring 910, the second annular ring 911 and the central drive plate 902 may vary depending on a specific design. Generally the number, N, of driving portions, such as sleeves 920, 922, range between 6 and 20 drive portions.

The roller sleeves 920 and 922 are advantageous in that they are self adjusting. As the track 300 passes over a roller sleeve 920 and 922, the pitch of the track 300 actually changes since the track 300 is elastomeric. The roller sleeves 920 and 922 accommodate such changes in pitch since they can roll between the drive lugs 322 rather than scrub the inner surface 320 between the drive lugs 322. The end result is that the roller sleeves 920 and 922 also prevent chatter or extra vibrations at various speeds of the track 300.

The central drive plate 902 of the drive sprocket assembly 900 is attached to a sprocket driving mechanism 930. The sprocket driving mechanism 930 is supported by brackets attached to the undercarriage of the frame 210. The sprocket driving mechanism 930 includes a housing having first scraper 940. Also attached to the sprocket driving mechanism 930 is a hydraulic pump 932. The hydraulic pump 932 is attached to a source of hydraulic fluid. As hydraulic fluid is passed through the hydraulic pump 932 an output shaft 934 turns a planetary transmission system housed within the sprocket driving mechanism 930. The central drive plate 902 is attached to an annular ridge 909 on the sprocket driving mechanism 930. A second scraper 942 is attached to one of the plates supporting the drive sprocket assembly, plate 907, which is attached to the undercarriage frame 210. There are a series of seals and a cap 905 that prevent contamination of the sprocket driving mechanism 930 with dirt or other contaminants.

Figure 8:
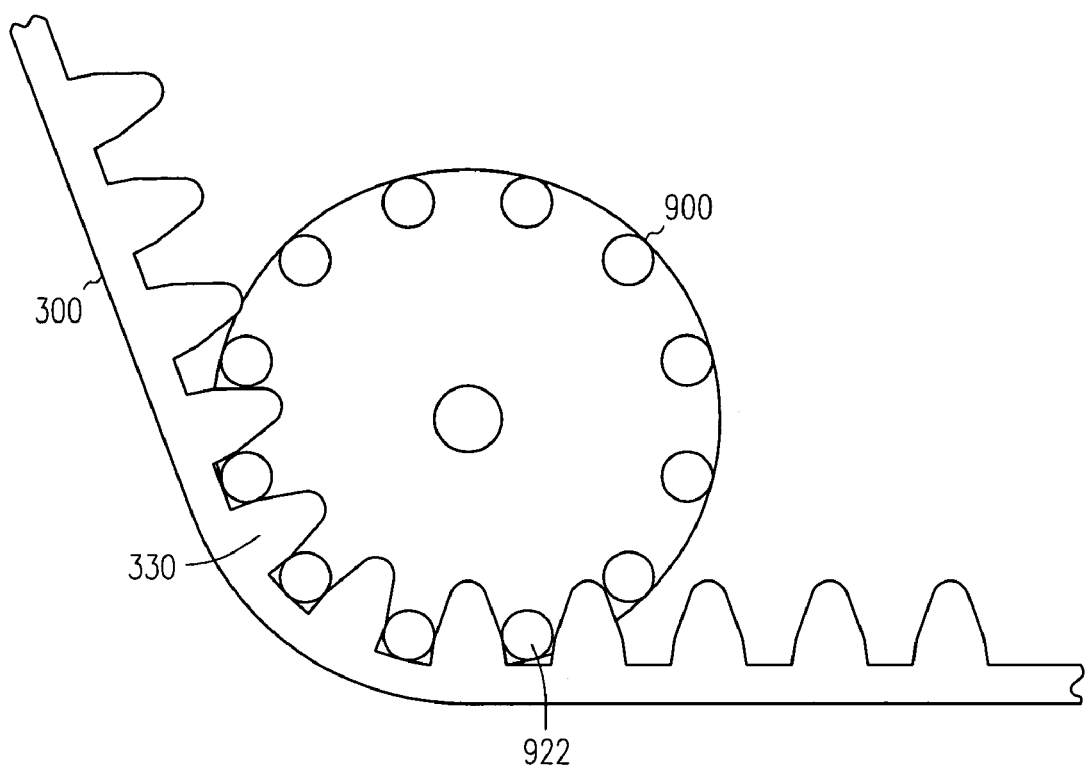
FIG. 8 is a schematic cross-sectional view of a track with driving lugs engaging the drive sprocket.

FIG. 8 is a schematic cross-sectional view of a track 300 having driving lugs 330 engaged with drive sprocket 900 having individual driving elements or portions 922. In this particular illustration, the drive belt 300 and the drive lugs 330 engage approximately four or five driving elements, such as sleeves 922. In this particular embodiment, the amount of wrap is 90 degrees. Of course, the amount of wrap can be lessened or greatened, depending upon the application. Also in this embodiment, the driving mechanism or drive sprocket 900 includes twelve sleeves, or driving portions 922. The number of driving portions, N, can be varied. The number of drive elements, such as sleeves 922, are varied based upon a number of things including the spacing between the lugs 330 on the belt 300.

Figure 10:
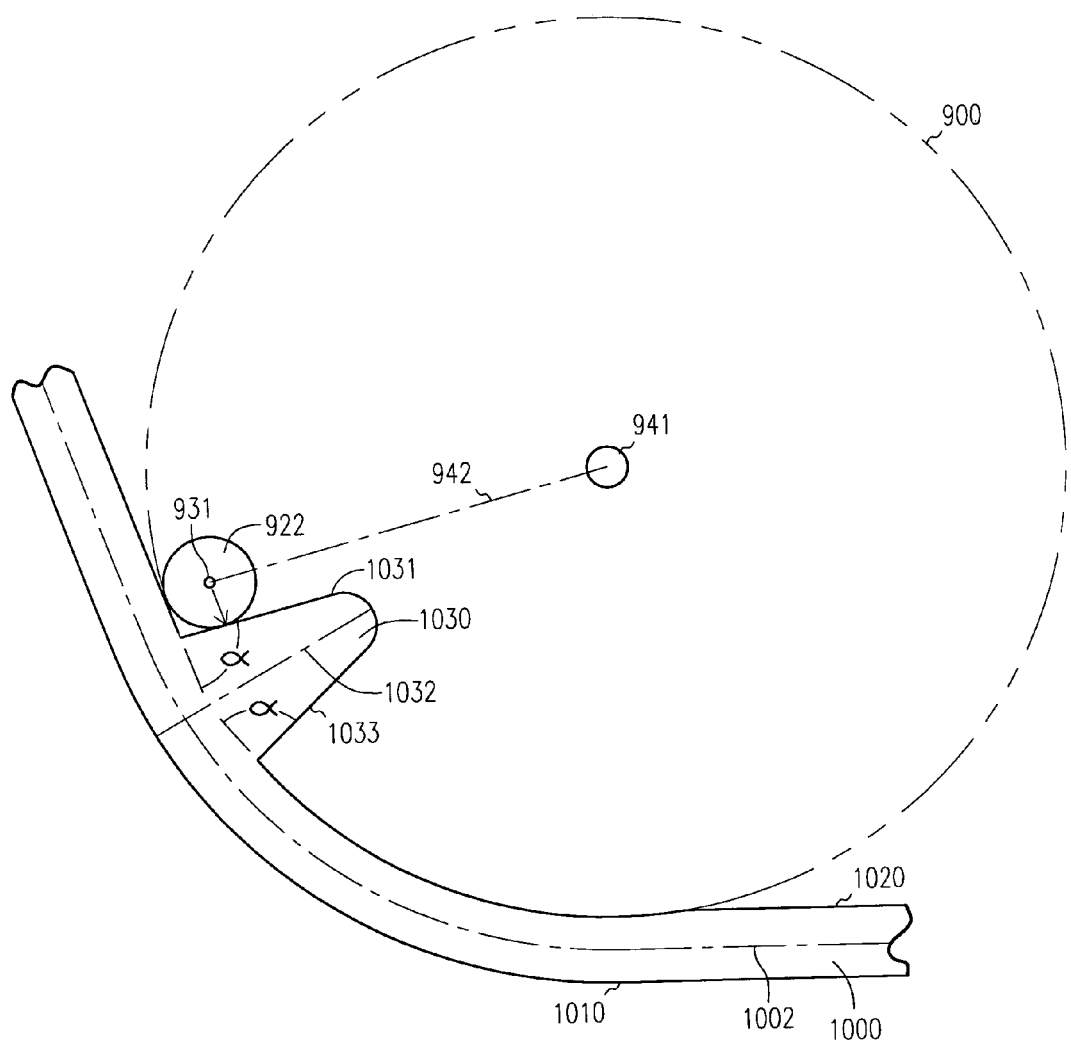
FIG. 10 is a cross-sectional schematic view showing a track and driving portion of the present invention.
Figure 11:
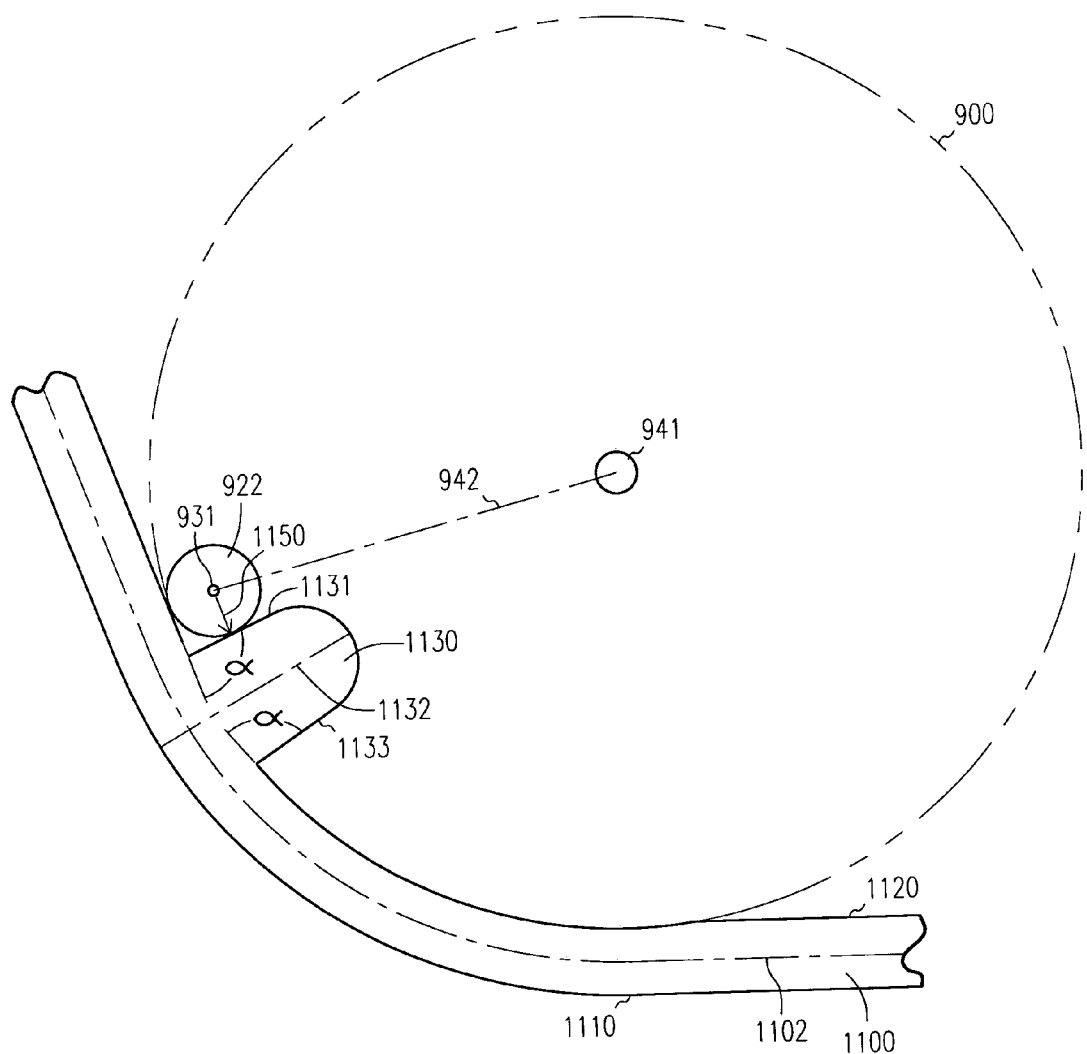
FIG. 11 is a cross-sectional schematic view showing a track and driving portion another embodiment of the present invention.

FIG. 9 is a schematic cross-sectional view of a track and drive portion of a prior art belt wrapped over a drive sprocket 900. In essence, FIGS. 9, 10 and 11 show the specific relation between a drive element, such as 922, and a lug 330 at the point of contact where the drive element 922 is driving the lug 330 in FIG. 8. FIG. 9 is a schematic cross-sectional view of a track 700 having a driving lug 830 as engaged with a sprocket 900 having a drive portion 922. As shown in FIG. 9, the belt 700 and lug 830 are associated with a prior art belt wrapped around or over the drive sprocket 900. The belt 800 includes an exterior surface 810 and an interior surface 820. A driving lug 830 is attached to the interior surface 820 of the belt 800. The driving lug includes a center line 832 which is substantially perpendicular to the pitch line 802 of the belt 800. The driving lug 830 also includes a first side wall 831 and a second side wall 833. The first and second side walls form an angle with respect to the interior surface 820 of the belt 800. In this particular instance, the angle, α, between the first side wall 831 and the interior surface of the belt 820 and the angle between the second side wall 833 and the interior surface 820 of the belt 800 are substantially equal. It should be pointed out that the angles may be slightly different or may be wholly different depending upon the application for the vehicle. The drive lug or drive element 922 drives against the first sidewall 831 of the driving lug 830. The drive portion 922 is a sleeve having an access 931. The drive sprocket 900 also has an access 940. Line 942 is a radial line extending from the axis 941 of the drive sprocket 900 through the axis 931 of the sleeve or driving portion 922. The drive portion contacts the driving lug 830 at arrow 850. As shown in FIG. 9, the first sidewall is not parallel with respect to the radial line 942. Thus, when the sleeve or driving portion of the drive sprocket 900 is forced against the first sidewall 831 of the lug 830, the driving portion or sleeve 922 has an opportunity to "go uphill". In other words, the first sidewall merely presents an incline surface to the sleeve 922 and so, therefore, it can easily climb the hill presented by the first sidewall 831 of the driving lug 830. In other words, it is very easy for the driving sprocket to ascend the incline presented causing the lug to move outwardly from the drive sprocket and possibly become dislodged or moved off of the drive sprocket 900. More likely than becoming dislodged is the fact that excessive amounts of noise, excessive amounts of power and excessive vibration is seen, especially when the drive sprocket is placing a very heavy load on the driving lug 831 of the belt 800. Such heavy load times are when there is an actual heavy load that is being moved by the vehicle or when turning the vehicle where one belt is moved in a first direction and another belt is moved in an opposite direction.

FIG. 10 is a cross-sectional schematic view showing a track 1000 driven by driving portion 922 of a drive sprocket according to the present invention. The belt 1000 includes an exterior surface 1010 and an interior surface 1020. The belt 1000 also includes a pitch line 1002. Attached to the interior surface 1020 of the belt 1000 is a driving lug 1030. The driving lug 1030 includes a first sidewall 1031 and a second sidewall 1033. The lug 1030 also includes a center line which is substantially perpendicular to the pitch line 1002 of the belt 1000 while it is being driven by the drive portion or sleeve 922. The first sidewall 1031 makes an angle α with respect to the interior surface 1020 of the belt 1000. Although not necessarily always true, the second sidewall 1033 makes the same angle α between the second sidewall 1033 and the interior surface of the belt 1000. The drive sprocket includes a center axis 941. The sleeve or driving portion 922 also includes a center axis 931. A radial line 942 which connects the axis 941 of the drive sprocket and the axis 931 of the sleeve is shown in FIG. 10. The invention, shown in FIG. 10, is that the angle α is selected so that a line along the first sidewall 1031 is substantially parallel to the line 942 while the driving portion 922 is being forced against the driving lug 1030. When the first sidewall 1031 of the lug 1030 is parallel to the radial line 942, the effect is that the driving portion or sleeve is hitting a flat wall with zero incline, or substantially no incline. As a result, the driving portion or sleeve 922 is not presented with any sort of incline which it could climb as it could in previously shown FIG. 9. This prevents the motion between the driving portion 922 and the lug 1030 and specifically against the first sidewall 1031 of the lug 1030. The end result is that the lug or the belt does not tend to move with respect to the sleeve and therefore does not become dislodged and does not scrub the driving lug 1030 of the belt 1000. This results in a much more efficient belt which does not vibrate or minimizes vibration and minimizes the amount of power used and also minimizes noise when the drive sprocket 900 is placing a large load on the belt 1000 and specifically on the lug 1030.

FIG. 11 is a cross-sectional schematic view showing a track 1100 and a driving portion 922 of another embodiment of the present invention. The track 1100 includes an interior surface 1120 and an exterior surface 1110. The track 1100 also has a pitch line 1102. Attached to the interior surface 1120 of the track 1100 is a driving lug 1130. The driving lug 1130 includes a center line 1132. The driving lug 1130 also has a first sidewall 1131 and a second sidewall 1133. The first sidewall 1131 and the second sidewall 1133 both make or define a line which makes an angle with respect to the interior surface 1120 of the belt 1100. In this case, as in others, the angles are equal. It may not be necessary, in other applications, to make the angles equal. The drive sprocket 900 includes a multiple number, N, of drive elements 922. The drive element 922 includes an axis 931. The driving sprocket 900 includes an axis 941. A line 942 or radial 942 is shown extending between the axis 941 of the drive sprocket and the axis 931 of the driving portion or sleeve 922. In this particular embodiment, a line defined by the first sidewall 1131 is non-parallel to the radial 942 when the sleeve or driving portion 922 is in contact and driving against the lug 1130. The arrow 1150 shows the point at which the drive portion or sleeve 922 is driving the lug 1130. In this particular case, the line defined by the first sidewall 1131 intersects the line or radial 942 at a point on the side of the interior surface 1120 of the belt 1100. The end result of this is that the line defined by the first sidewall 1131 is declining or is sloped into the belt 1100. In other words, the sleeve or driving portion will actually roll "down hill" into the corner or pocket produced between the first sidewall 1131 of the driving lug 1130 and the interior surface 1120 of the belt 1100. Due to the incline or decline formed between the first sidewall 1131 and the line 942, the driving element or sleeve 922 will not "climb" the sidewall 1131. There is no real force that wants to allow it to allow the sleeve 922 to climb an incline, but rather it forces it into engagement with the lug as well as with the interior surface 1120 of the belt 1100. This results in, again, less power being consumed and less noise, less vibration and a much more efficient drive system.

In essence, the invention is to create a sidewall 1131 such that when it engages with the drive sprocket or the drive mechanism, the driving portion will be driven into engagement with a driving lug that will not provide an easy incline for the driving portion or sleeve 922 to "climb". In other words, the lug when presented to be driven, as shown in FIGS. 10 and 11, will either present a substantially flat wall, or a decline which would drive the driving portion 922 into engagement with the lug and the interior surface of the belt or will present a very, very steep incline. As a result, the angle α which the sidewalls make with respect to the interior surface of the belt can be within a particular range where a very steep incline or a decline or a flat face may be presented for driving or to be driven by the driving portion 922. The range may be from plus or minus five degrees, plus or minus three degrees, plus or minus two degrees and plus or minus one degree. In some instances the angle α may present a very flat face and there would be no range through which it could be varied so that chatter or vibrations or excessive power use would not result.

It has been found that the angle α is actually related to the number of driving portions or sleeves 922 which are placed equal distance or substantially equal distance around the drive sprocket 900. For example, as shown twelve sleeves 922 or positioned around the drive sprocket. In other words, the sleeves are roughly 30 degrees apart from one another about the circumference of the drive sprocket 900. In other instances there may be only ten driving portions or sleeves 922 about the drive sprocket 900 so that each driving portion or sleeve is 36 degrees apart or displaced by 36 degrees from the neighboring sleeve. Other numbers, N, of sleeves may be equally distributed around the drive sprocket 900. The relation between α and the number of driving portions 922 or sleeves is as follows:

$$\alpha = [90-(360 \div 2/N)]$$

N equals number of driving portions or sleeves in the drive sprocket.

If α=[90−(360÷2/N)], then the sidewall such as 1031 will be essentially parallel or substantially parallel to the line 942 as shown in FIG. 10. If α is larger than [90−(360÷2/N)], then a declining surface or surface that the sleeve 922 will want to "roll down" and into the area bounded by the sidewall 1131 and the interior surface 1120 will be produced. If the angle α is less than [90−(360÷2/N)] then an incline which the driving element or sleeve 922 can "climb" will be presented at the time the driving lug is to be driven by the driving portion 922. Any time an incline is presented or where a is smaller than [90−(360÷2/N)], there is a possibility that the driving portion will climb the sidewall of the lug and produce chatter, noise, power loss and scrubbing. Therefore, it is best to keep the angle α at equal to or greater than α based upon the formula set forth above. In this instance, either a flat wall or declining wall which forces the drive element or sleeve 922 into engagement with the drive lug is presented at the time the driving portion 922 is driving the lug 1030, 1130. Of course, the amount of declination occurs in ranges as mentioned above.

Advantageously, the vehicle will travel over soft surfaces without causing damage to the surface. The drive belt having lugs which are designed to resist dislodging or jumping off the track so that less power is needed to drive the track for given loads. In addition, the track with the drive lugs needs a minimal amount of wrap around the circumference of the drive sprocket to stay engaged with the sprocket. The track requirement of a minimal amount of wrap, opens up the design possibilities. In addition, belt tension does not have to be tightened and maintained to make sure the belt stays on the drive sprocket. The lesser belt tension lessens the amount of power needed. The lesser belt tension also lengthens the life of the belt. The sprocket and track with these drive lugs minimize "scrubbing" between the driving lugs and the sprocket driver. The sprocket is self cleaning and removes debris from the sprocket area to minimize problems associated with debris build up changing the pitch relationship between the sprocket and the flat track. The resulting vehicle is very effective in transmitting power to the surface over which it passes. The vehicle requires very low maintenance since is less prone to track derailment.

CONCLUSION

A vehicle for traversing a surface includes a track. The track has an inner surface and an outer surface for gripping. The inner surface has a plurality of driving lugs attached to the inner surface. A driver sprocket drives the track. The driver sprocket has a driving portion. The driving lugs have sidewalls which make an angle with respect to the inner surface of the track such when the driving lug engages the driver sprocket, the sidewall of the driving lug presents a surface substantially parallel to a radial acting through a driving portion of the drive sprocket when engaged with the track. In one embodiment, the driver sprocket engages at least one of said plurality of driving lugs when the driving sprocket is driving the track. In another embodiment, the driver sprocket engages at least two of said plurality of driving lugs when the driving sprocket is driving the track. The driving portion of the drive sprocket may include a sleeve which, optionally, may be adapted for rotation. In one embodiment, the driving portion of the drive sprocket includes a first sleeve having a first axis and a second sleeve having a second axis. As arranged on the sprocket, the first axis and the second axis are substantially colinear and the first sleeve is separated from the second sleeve. Optionally, the first sleeve and the second sleeve may be rotatable sleeves. The driving lugs are formed into two aligned rows on the inner surface of the track, in one embodiment. The driving lugs may have walls which present a surface tangent to the driving portion defining a non parallel line to present a declined surface to the driving portion. The declined surface would tend to force the driving portion into engagement with the drive belt.

A drive belt for a vehicle is adapted to engage a drive sprocket with n number of driving portions. The drive belt includes a track portion further including an interior surface, an exterior surface, and a pitch line positioned between the interior surface and the exterior surface. Driving lugs are attached to the interior surface of the drive belt. Each of the driving lugs has at least a first sidewall making an angle with respect to the pitch line of the track. The angle of the first sidewall with respect to the pitch line of the track is in the range of [90−(360/2n)] plus or minus 5 degrees, in some embodiments. In other embodiments, the angle is in the range of [90−(360/2n)] plus or minus 3 degrees, or the angle is in the range of [90−(360/2n)] plus or minus 2 degrees, or the angle is in the range of [90−(360/2n)] plus or minus 1 degree. In one embodiment, the angle is substantially equal to [90−(360/2n)]. The driving lug has a second sidewall with a second angle. In one embodiment, the second angle is substantially equal to the angle of the first side wall. The drive belt fits on a vehicle with a drive sprocket having driving portions. The first angle which the first side wall of the driving lug makes with respect to the pitch line of the track results in a line substantially parallel to a line from the axis of a drive sprocket through the driving portion of the drive sprocket while the drive lug is being driven by the driving portion of the driving sprocket. In another embodiment, the first angle which the first side wall of the driving lug makes with respect to the pitch line of the track results in a non parallel line with respect to a line from the axis of a drive sprocket through the driving portion of the drive sprocket while the drive lug is being driven by the driving portion of the driving sprocket. In some embodiments, the non parallel line intersects the line from the axis of the drive sprocket at a point below the pitch line of the track. In other embodiments, the non parallel line intersects the line from the axis of the drive sprocket at a point above the pitch line of the track. In some embodiments, the non parallel line presents a surface to the driving portion of the sprocket which declines toward the surface of the track. The driving portions of the sprocket may be sleeves which may be rotatable. In other instances, the driving portions of the sprocket are rotatable. In one embodiment, the driving portions of the sprocket are substantially equally radially spaced about the drive sprocket.

Although specific embodiments have been illustrated and described herein, it is appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and the equivalents thereof.

What is claimed is:

1. A vehicle for traversing a ground surface comprising:
 a track comprising:
  an inner surface, said inner surface having a plurality of driving lugs attached to the inner surface; and
  an outer surface for gripping the ground surface;
 a driver sprocket for said track having a central axis about which the driver sprocket rotates, the driver sprocket also having a driving portion that includes a center, the driving lugs having sidewalls which make an angle with respect to the inner surface of the track such that when the driving lug engages the driving portion of the driver sprocket, the sidewall of the driving lug being substantially parallel to a radial line that intersects the central axis of the driver sprocket and passes through the center of the driving portion of the drive sprocket when engaged with the track.

2. The vehicle of claim 1 wherein the driver sprocket engages at least one of said plurality of driving lugs when the driving sprocket is driving the track.

3. The vehicle of claim 1 wherein the driver sprocket engages at least two of said plurality of driving lugs when the driving sprocket is driving the track.

4. The vehicle of claim 1 wherein the driving portion of the drive sprocket includes a sleeve.

5. The vehicle of claim 1 wherein the driving portion of the drive sprocket includes a sleeve adapted for rotation.

6. The vehicle of claim 1 wherein the driving portion of the drive sprocket includes a first sleeve having a first axis and a second sleeve having a second axis, the first axis and the second axis being substantially colinear, the first sleeve separated from the second sleeve.

7. The vehicle of claim 6 wherein the first sleeve and the second sleeve are rotatable sleeves.

8. The vehicle of claim 1 wherein the driving lugs are formed into two aligned rows on the inner surface of the track.

9. A drive belt for a vehicle, the drive belt adapted to engage a drive sprocket having n number of driving portions, the drive belt comprising:
 a track portion comprising:
  an interior surface;
  an exterior surface; and a pitch line positioned between the interior surface and the exterior surface; and driving lugs attached to the interior surface of the drive belt, each of the driving lugs having at least a first sidewall making an angle with respect to the pitch line of the track, the angle being in the range of [90−(360/2n)] plus or minus 5 degrees; and a drive sprocket having driving portions, wherein the first angle which the first side wall of the driving lug makes with respect to the pitch line of the track results in a line substantially parallel to a line from the axis of a drive sprocket through the driving portion of the drive sprocket while the drive lug is being driven by the driving portion of the driving sprocket.

10. The drive belt of claim 9 wherein the angle is in the range of [90−(360/2n)] plus or minus 3 degrees.

11. The drive belt of claim 9 wherein the angle is in the range of [90−(360/2n)] plus or minus 2 degrees.

12. The drive belt of claim 9 wherein the angle is in the range of [90−(360/2n)] plus or minus 1 degree.

13. The drive belt of claim 9 wherein the angle is substantially equal to [90−(360/2n)].

14. The drive belt of claim 9 wherein the driving lug has a second sidewall with a second angle, the second angle being substantially equal to the angle of the first side wall.

15. The drive belt of claim 9 fitting on a vehicle further comprising a drive sprocket having driving portions, wherein the first angle which the first side wall of the driving lug makes with respect to the pitch line of the track results in a non-parallel line with respect to a line from the axis of a drive sprocket through the driving portion of the drive sprocket while the drive lug is being driven by the driving portion of the driving sprocket.

16. The drive belt of claim 15 wherein the non-parallel line intersects the line from the axis of the drive sprocket at a point below the pitch line of the track.

17. The drive belt of claim 15 wherein the non-parallel line presents a surface to the driving portion of the sprocket which declines toward the surface of the track.

18. The drive belt of claim 15 wherein the non-parallel line intersects the line from the axis of the drive sprocket at a point above the pitch line of the track.

19. The drive belt of claim 15 wherein the driving portions of the sprocket are sleeves.

20. The drive belt of claim 19 wherein the driving portions of the sprocket are rotatable.

21. The drive belt of claim 15 wherein the driving portions of the sprocket are rotatable.

22. The drive belt of claim 15 wherein the driving portions of the sprocket are substantially equally radially spaced about the drive sprocket.

23. A vehicle for traversing a ground surface comprising:
a track comprising:
an inner surface, said inner surface having a plurality of driving lugs attached to the inner surface; and
an outer surface for gripping the ground surface; and
a driver sprocket for said track having a central axis about which the driver sprocket rotates, the driver sprocket also having a driving portion that includes a center, the driving lugs having sidewalls which make an angle with respect to the inner surface of the track such that when the driving lug engages the driving portion of the driver sprocket, the sidewall of the driving lug being non-parallel to a radial line that intersects the central axis of the driver sprocket engaging the sidewall of the driving lug, and passes through the center of the driving portion of the drive sprocket engaged with the track, a line along a surface of the driving lug intersecting the radial line at a point inside the radius of the track.

24. A drive system for a vehicle comprising:
a drive belt adapted to engage a drive sprocket having n number of driving portions, the drive belt comprising:
a track portion comprising:
an interior surface;
an exterior surface; and
a pitch line positioned between the interior surface and the exterior surface; and
driving lugs attached to the interior surface of the drive belt, each of the driving lugs having at least a first sidewall making an angle with respect to the pitch line of the track, the angle being in the range of [90−(360/2n)] plus or minus 5 degrees, where n is the number of driving lugs; and
the drive sprocket having driving portions, wherein the first angle which the first side wall of the driving lug makes with respect to the pitch line of the track results in a non-parallel line with respect to a line from the axis of a drive sprocket through the driving portion of the drive sprocket while the drive lug is being driven by the driving portion of the driving sprocket, wherein the non-parallel line intersects the line from the axis of the drive sprocket at a point above the pitch line of the track.

* * * * *